United States Patent [19]
Sakamaki et al.

[11] 3,977,782
[45] Aug. 31, 1976

[54] WARMTH KEEPING METHOD FOR COPYING MACHINE

[75] Inventors: Hisashi Sakamaki, Yokohama; Yoshimasa Kimura; Toshio Honma, both of Kawasaki; Tsuneki Inuzuka, Fuchu; Katsushi Furuichi, Yokohama, all of Japan

[73] Assignee: Canon Kabushiki Kaisha, Tokyo, Japan

[22] Filed: Dec. 12, 1974

[21] Appl. No.: 531,876

[30] Foreign Application Priority Data

Dec. 21, 1973 Japan .................................... 49-793

[52] U.S. Cl. .................................... 355/30; 355/3 R
[51] Int. Cl.[2] .......................................... G03B 27/52
[58] Field of Search ......................... 355/30, 48, 3 R

[56] References Cited

UNITED STATES PATENTS

| | | | |
|---|---|---|---|
| 2,481,694 | 9/1949 | Schubert et al. | 355/48 |
| 3,592,538 | 7/1971 | Ukai | 355/30 X |
| 3,848,988 | 11/1974 | Thettu et al. | 355/30 X |

*Primary Examiner*—Richard A. Wintercorn
*Attorney, Agent, or Firm*—Fitzpatrick, Cella, Harper & Scinto

[57] ABSTRACT

There is disclosed a method of maintaining at a desired level the temperature of components in a copying machine which is in its idle state. An electric power is supplied members in the machine having an impedance component after the copying operation has been stopped. The voltage of the power must be set at a value lower than the rated voltage of the members.

6 Claims, 2 Drawing Figures

WARMTH KEEPING METHOD FOR COPYING MACHINE

BACKGROUND OF THE INVENTION

1. Field of the Invention

This invention relates to a warmth keeping method for a copying machine, and more particularly to a method for keeping the entire machine installed in a cold place at a constant temperature during the period while the machine is left inoperative.

2. Description of the Prior Art

In a copying machine of the type in which the various copying steps such as charging, exposure and development are accomplished on a sensitive medium having a photoconductive material, the quality and properties of the sensitive medium, corona discharge and developer are the important elements for obtaining a high-quality image. These elements have strong temperature dependency, and in many cases, it is hard to obtain images of good quality constantly, particularly when the ambient temperature is low. This has close relation to the mobility of the light-excited carrier and other like factors, but as such matters have no direct bearing on the import of the present invention, no discussion on their physical meaning is given here.

The copying machine is usually adjusted to operate most efficiently at room temperature, that is, at a temperature of from 20° to 25°C. To a cold district, the room temperature of an office at night time in winter (with the air-heater being switched off) may drop to around −10°C, so that when the cold machine is started in the morning, it takes a considerably long time before the machine temperature is raised up to the same level as room temperature even if the room is warmed by the air-heater, and hence no good-quality images can be obtained at the beginning. As a means for keeping warmth in the inside of the machine when the machine is left inoperative at night time, it has been the general practice to insert a heating element (such as a nicrome wire heater) with a capacity of from several to several ten watts into the machine to keep the intra-machine temperature at a certain level.

SUMMARY OF THE INVENTION

The present invention concerns a method for keeping warmth in the copying machine without the use of any specific heating element or unit such as above-mentioned. According to the method of the present invention, a built-in member having an impedance component, such as for example the stabilizer or transformer of the fluorescent lamp or the motor provided in the machine, is utilized as a heat source for maintaining the temperature of the machine substantially constant at a desired level. The essential point of this method resides in that when said member, which is normally used at (for example) AC 100 V, is utilized as a heat source for the purpose of keeping warmth in the machine, only a fraction of the normally used AC voltage is applied, or a DC voltage necessary for obtaining the desired heat source is applied. In this case, any rise of coil temperature must of course be restricted within the limits of the insulation class of the winding used.

Thus, according to the present invention, there is provided a method of keeping warm the means which must be maintained at a certain elevated temperature when restarting a copying machine, characterized in that a voltage far lower than the rated voltage used in actual copying operation is applied to a member or members having an impedance component in the machine, after the machine has been shut down.

DESCRIPTION OF THE PREFERRED EMBODIMENT

Figure 1:
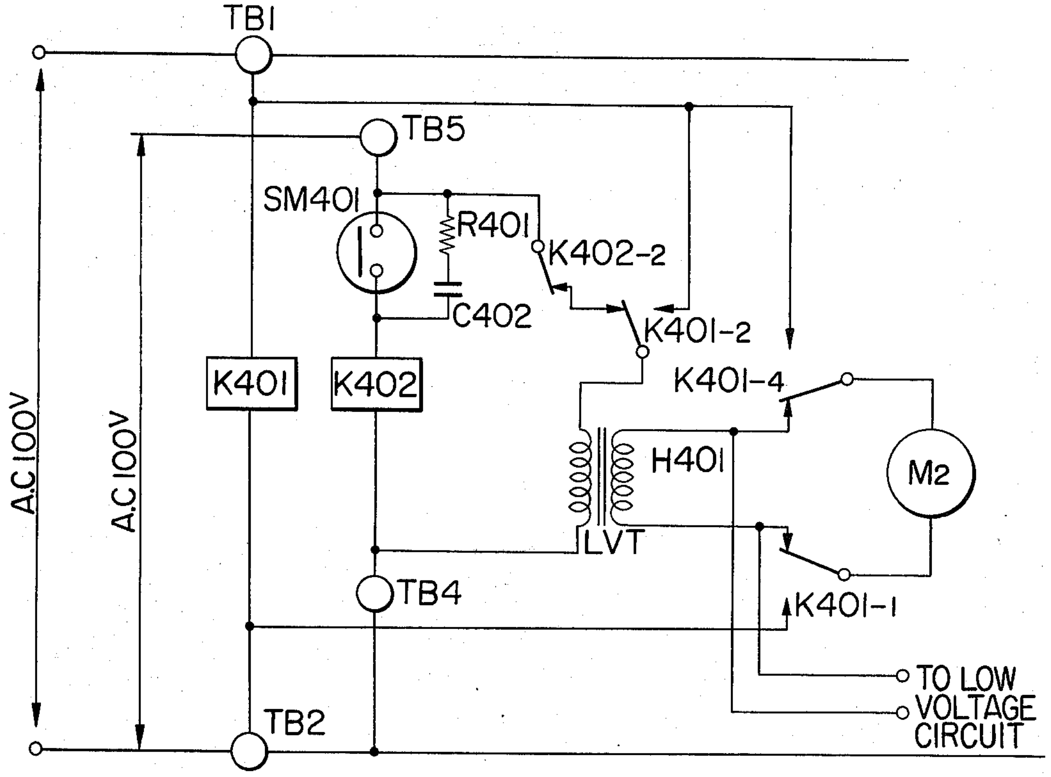
FIG. 1 is an electric circuit diagram for illustrating an embodiment of the present invention.

The present invention is now described in detail by way of an embodiment thereof with reference to the accompanying drawings. Referring to FIG. 1, there is shown only that portion of an electric circuit used in an ordinary copying machine which has direct relation to the present invention, so as to simplify the discussion of the invention. Although not shown, an arrangement is made such that the rated voltage of AC 100 V applied to the terminals TB1 and TB2 is shut off when the main switch of the copying machine is turned off or when the copying operation is completed. When the machine is in the operative condition, the relay K401 is connected and the contacts K401-1, K401-4 of said relay K401 move to their "make" sides to operate the drive motor M2 through a transformer LVT to actuate the respective operative parts of the machine, thus making it possible to start the copying machine operation.

Then, when the main switch is turned off after completion of the copying operation, the heater, lamp and all other electric elements, not shown, are disconnected from power. When the relay K401 is disconnected, its contacts K401-1 and K401-4 move to their "break" sides to shut down the motor M2.

Now, when the temperature in the machine drops below a certain set level, the thermoswitch SM 401 is turned on. At this time, since the rated voltage of AC 100 V is being applied to the terminals TB4 and TB5 regardless of the behavior of the main switch, the relay K402 is connected, and its contact K402-2 and the normally closed contact K401-2 of the relay K401 are both brought into the closed position, so that AC 100 V is applied to the primary side of the transformer LVT via the terminal TB5. Said transformer LVT is arranged to produce a voltage of approximately AC 40 V at its secondary side. This is utilized as a low voltage circuit for the electromagnetic clutch and semiconductor circuit during the copying operation. If the voltage of this low voltage circuit is supplied to the rated 100 V motor M2 when the machine is out of operation, said motor M2 remains inoperative, and hence substantially all of the electric power supplied is efficiently converted into heat.

Although a lowered AC voltage is applied in the embodiment of FIG. 1, substantially the same effect can be obtained by applying a full-wave or half-wave rectified current to the secondary side of the transformer LVT.

Also, in this embodiment of the present invention, the power is connected not only to a single specified part such as a heater, but also to all the members necessary for retaining a certain temperature in the machine, such as a transformer, illuminating lamp, fixing unit heater, motor, fluorescent lamp stabilizer, etc. This permits retention of temperature at, for instance, about 10°C for not only certain specific parts such as the sensitive medium, corona discharger and developing means, but also the entirety of the machine uniformly, making it possible to obtain high-quality images upon restart of the copying machine.

Figure 2:
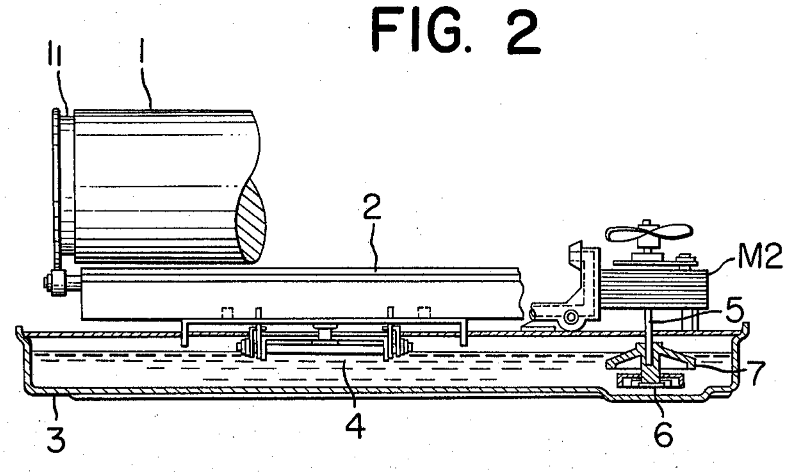
FIG. 2 is a sectional view of a liquid developing mechanism in the device adapted in accordance with the present invention.

The present invention also envisages an embodiment for use in case it is considered inexpedient from the viewpoint of loss of resource to keep the temperature in the entire machine at about 10°C. In such a case, the device of the present invention is applied to only such members which one desires to keep heated to the minimum required temperature at the resumption of the copying operation. In the case of a copying machine of a liquid developing system, it is of vital importance to keep the temperature of the developer and sensitive medium at about 10°C. For retaining temperature of the liquid developer, it is extremely effective to keep alive the circuit to the developer stirring motor M2 such as shown in FIG. 2.

In this case, an AC voltage or full- or half-wave rectified DC voltage lower than the rated voltage is applied to the stirring motor M2 in the manner described above, whereby the heat generated from the stator winding of said motor M2 is transmitted through the rotor shaft 5 and agitating blades 6, 7 into the developing solution 4 in the container 3 to raise the temperature of the solution, thereby accomplishing the desired object.

We claim:

1. A method of maintaining a copy processing component of a non-operating copying machine in a state such that copies may be readily obtained, wherein the machine includes a plurality of members, other than said component, which generate heat while having respective operating functions other than the generation of heat when energized at a particular rated voltage during operation of the machine, said method comprising the steps of:

a. maintaining said component at a predetermined temperature by applying a voltage to at least one of the members; and b. supplying said applied voltage at a value lower than said rated voltage while the machine is in a non-operating condition so that said at least one member produces heat.

2. A method in accordance with claim 1, further including the step of controlling the application of said voltage in relation to the temperature within said machine.

3. A method in accordance with claim 1, further including the step of deriving said applied voltage from a low voltage circuit source in said machine.

4. A method in accordance with claim 1, wherein said machine includes a reservoir for liquid developer and a motor for use in circulating the liquid developer, and wherein said step of applying said voltage to a member is performed by applying said voltage to said motor.

5. A method of maintaining a copy processing component of a non-operating copying machine in a state such that copies may be readily obtained, said machine including at least one member, other than said component, having an electrical winding with an associated rated voltage, wherein said winding generates heat while having an operating function other than the generation of heat during operation of the machine, said method comprising the steps of:

a. maintaining said component at a predetermined temperature by applying a voltage to a said winding; and b. supplying said applied voltage at a value lower than said rated voltage while the machine is in a non-operating condition so that said at least one member produces heat.

6. A method in accordance with claim 5 wherein said copy machine is of the type having a photosensitive drum, a reservoir for liquid developer and a corona discharger, and wherein said member is disposed in the vicinity of at least one of said drum, said developer or said discharger.

* * * * *